US010469527B2

(12) United States Patent
Gordeychik et al.

(10) Patent No.: US 10,469,527 B2
(45) Date of Patent: Nov. 5, 2019

(54) SYSTEM AND METHOD OF PROTECTION OF TECHNOLOGICAL SYSTEMS FROM CYBER ATTACKS

(71) Applicant: AO Kaspersky Lab, Moscow (RU)

(72) Inventors: Sergey V. Gordeychik, Moscow (RU); Andrey B. Lavrentyev, Moscow (RU); Andrey P. Doukhvalov, Moscow (RU)

(73) Assignee: AO Kaspersky Lab, Moscow (NO)

( * ) Notice: Subject to any disclaimer, the term of this patent is extended or adjusted under 35 U.S.C. 154(b) by 0 days.

(21) Appl. No.: 15/255,773

(22) Filed: Sep. 2, 2016

(65) Prior Publication Data

US 2017/0244752 A1    Aug. 24, 2017

(30) Foreign Application Priority Data

Feb. 18, 2016   (RU) ................ 2016105562

(51) Int. Cl.
*H04L 29/06*    (2006.01)
*H04L 29/08*    (2006.01)

(52) U.S. Cl.
CPC ...... *H04L 63/1458* (2013.01); *H04L 63/1425* (2013.01); *H04L 67/1095* (2013.01)

(58) Field of Classification Search
CPC .................. H04L 63/1408; H04L 63/123
See application file for complete search history.

(56) References Cited

U.S. PATENT DOCUMENTS

| 5,550,742 | A | * | 8/1996 | Furuya | G05D 1/0883 |
| | | | | | 244/172.4 |
| 6,553,355 | B1 | * | 4/2003 | Arnoux | H04L 12/28 |
| | | | | | 706/13 |
| 7,490,031 | B1 | * | 2/2009 | Qiu | G06F 8/38 |
| | | | | | 703/22 |
| 7,949,417 | B2 | | 5/2011 | Peterson et al. | |
| 8,005,575 | B2 | | 8/2011 | Kirchhof | |
| 8,055,484 | B1 | | 11/2011 | Ciolfi et al. | |
| 8,457,936 | B2 | | 6/2013 | Harris | |

(Continued)

FOREIGN PATENT DOCUMENTS

| JP | 2005-332360 A | 12/2005 |
| WO | 2015/104691 A2 | 7/2015 |

OTHER PUBLICATIONS

European Search Report for EP 16191201 dated Feb. 6, 2017.

*Primary Examiner* — Mohammed Waliullah
(74) *Attorney, Agent, or Firm* — Arent Fox LLP; Michael Fainberg

(57) ABSTRACT

Disclosed are systems and methods for protection of a technological system (TS) from cyber attacks. An exemplary method comprises: obtaining a real state of the TS; initializing a cybernetic control system (CCS) by synchronizing the CCS with the TS; comparing, by the CCS, the real state of the TS with an ideal state of the TS; based on the comparison, identifying a deviation of the real state of the TS from the ideal state of the TS; when the deviation is identified, checking an integrity of at least functional interconnections of the states of one or more elements of the TS; determining whether the ideal state of the TS is a modeling error based on one or more confirmed sustained functional interconnections between elements of the TS; and identifying anomalies in the TS based on one or more disturbed functional interconnections between elements of the TS.

18 Claims, 8 Drawing Sheets

(56) References Cited

U.S. PATENT DOCUMENTS

| | | | |
|---|---|---|---|
| 2003/0231297 A1* | 12/2003 | Endo | G01M 11/3145 356/73.1 |
| 2005/0060579 A1* | 3/2005 | Dickelman | H04L 63/1408 726/4 |
| 2006/0034305 A1 | 2/2006 | Heimerdinger et al. | |
| 2007/0107052 A1* | 5/2007 | Cangini | G06F 21/554 726/22 |
| 2008/0279066 A1* | 11/2008 | Kikukawa | G11B 20/10009 369/53.1 |
| 2009/0265784 A1* | 10/2009 | Waizumi | H04L 63/1458 726/23 |
| 2011/0020122 A1 | 1/2011 | Parthasarathy et al. | |
| 2012/0101800 A1 | 4/2012 | Miao et al. | |
| 2013/0205393 A1 | 8/2013 | Hamzaoui et al. | |
| 2014/0189860 A1 | 7/2014 | Hull Roskos | |
| 2016/0330225 A1* | 11/2016 | Kroyzer | G06F 21/552 |

* cited by examiner

SYSTEM AND METHOD OF PROTECTION OF TECHNOLOGICAL SYSTEMS FROM CYBER ATTACKS

CROSS-REFERENCE TO RELATED APPLICATIONS

This application claims benefit of priority under 35 U.S.C. 119(a)-(d) to a Russian Patent Application No. 2016105562 filed on Feb. 18, 2016, which is incorporated by reference herein.

FIELD OF TECHNOLOGY

The present disclosure relates generally to the field of security, and more specifically to systems and methods for protection of of technological systems from cyber attacks.

BACKGROUND

Cyber attacks on technological systems (TS) of critical infrastructure, such as denial of service attacks, increased significantly in recent years. Therefore, there is an ever increasing need to improve protection of technological systems of critical infrastructure from such attacks.

The most popular methods of protecting technological systems of critical infrastructure are modeling and filtering of the control parameters acting on the technological objects of the critical infrustructure. There are diverse variants of implementation of these methods.

Some known methods discover anomalies (i.e., a deviation from normal operation) in the working of objects of critical infrastructure, such as falsification of control parameters used to control the objects of infrastructure. Anomalies may be detected based on modeling of normal activity of the objects and detecting deviations the norm in the functioning of a system.

However, known methods for protection of TS do not allow monitoring and controlling operation of different subsystems and levels of the TS at specified time.

SUMMARY

Disclosed are systems and methods for protection of a technological system (TS) from cyber attacks. An exemplary method comprises: obtaining a real state of the TS at an arbitrary point in time or continually, wherein the state of the TS is determined based on states of one or more elements of the TS; initializing a cybernetic control system (CCS) by synchronizing the CCS with the TS in terms of time or in terms of state of one or more elements of the TS; comparing, by the CCS, the real state of the TS with an ideal state of the TS; based on the comparison, identifying a deviation of the real state of the TS from the ideal state of the TS; when the deviation is identified, checking an integrity of at least functional interconnections of the states of one or more elements of the TS; determining whether the ideal state of the TS for the point in time is a modeling error based on one or more confirmed sustained functional interconnections between elements of the TS; and identifying anomalies in the TS based on one or more disturbed functional interconnections between elements of the TS.

In one exemplary aspect, obtaining a real state of the TS includes using software, hardware or firmware agents deployed in the TS to intercept signals between elements of the TS.

In one exemplary aspect, the CCS consists of a plurality of interconnected cybernetic blocks (CB) that duplicate the interconnection of elements of the TS and establish cause and effect relationships between input and output signals of each CB, and wherein the relationship established by each CB is defined using one or more of a mathematical model, a logic model, a numerical model, a physical model, and a simulation model.

In one exemplary aspect, checking an integrity of at least functional interconnection of the states of one or more elements of the TS includes: initializing the CCS by the real state of an object of control of the TS; determining the ideal state of control subjects by modeling performed by the CCS for a given state of the object of control; and determining the ideal states determined by the CCS for the control subjects of the TS as compared to the real states of the control subjects of the TS.

In one exemplary aspect, checking the integrity of at least functional interconnection of the states of one or more elements of the TS includes: comparing the ideal state of control subjects of the TS as determined by the CCS for a given state of an object of control with the real state of the control subjects of the TS for the same state of the object of control; and determining that the functional interconnection is disturbed when the ideal state of control subjects of the TS for a given state of an object of control does not coincide with the real state of the control subjects of the TS for the same state of the object of control, determining that the functional interconnection is sustained when the ideal state of control subjects of the TS for a given state of an object of control coincides with the real state of the control subjects of the TS for the same state of the object of control.

In one exemplary aspect, a value of the deviation is computed as:

$$\frac{|Q_{id} - Q_r|}{Q_{id}} < \Delta, \text{ where}$$

Qid is the ideal state of the TS as determined by the CCS; Qr is the real state of the TS; $\Delta$ is the permissible deviation.

In one exemplary aspect, synchronizing CCS is done by synchronizing state of each cybernetic block of the CCS with the state of a corresponding element of the TS.

In one exemplary aspect, a system for protection of a TS from cyber attacks comprises: a hardware processor configured to obtain a real state of the TS at an arbitrary point in time or continually, wherein the state of the TS is determined based on states of one or more elements of the TS; initialize a cybernetic control system (CCS) by synchronizing the CCS with the TS in terms of time or in terms of state of one or more elements of the TS; compare, by the CCS, the real state of the TS with an ideal state of the TS; based on the comparison, identify a deviation of the real state of the TS from the ideal state of the TS; when the deviation is identified, check an integrity of at least functional interconnections of the states of one or more elements of the TS; determine whether the ideal state of the TS for the point in time is a modeling error based on one or more confirmed sustained functional interconnections between elements of the TS; and identify anomalies in the TS based on one or more disturbed functional interconnections between the plurality of elements of the TS.

In one exemplary aspect, a non-transitory computer readable medium storing computer executable instructions for protection of a TS from cyber attacks, includes instructions for: obtaining a real state of the TS at an arbitrary point in time or continually, wherein the state of the TS is determined based on states of one or more elements of the TS; initializing a cybernetic control system (CCS) by synchronizing the CCS with the TS in terms of time or in terms of state of one or more elements of the TS; comparing, by the CCS, the real state of the TS with an ideal state of the TS; based on the comparison, identifying a deviation of the real state of the TS from the ideal state of the TS; when the deviation is identified, checking an integrity of at least functional interconnections of the states of one or more elements of the TS; determining whether the ideal state of the TS for the point in time is a modeling error based on one or more confirmed sustained functional interconnections between elements of the TS; and identifying anomalies in the TS based on one or more disturbed functional interconnections between the plurality of elements of the TS.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
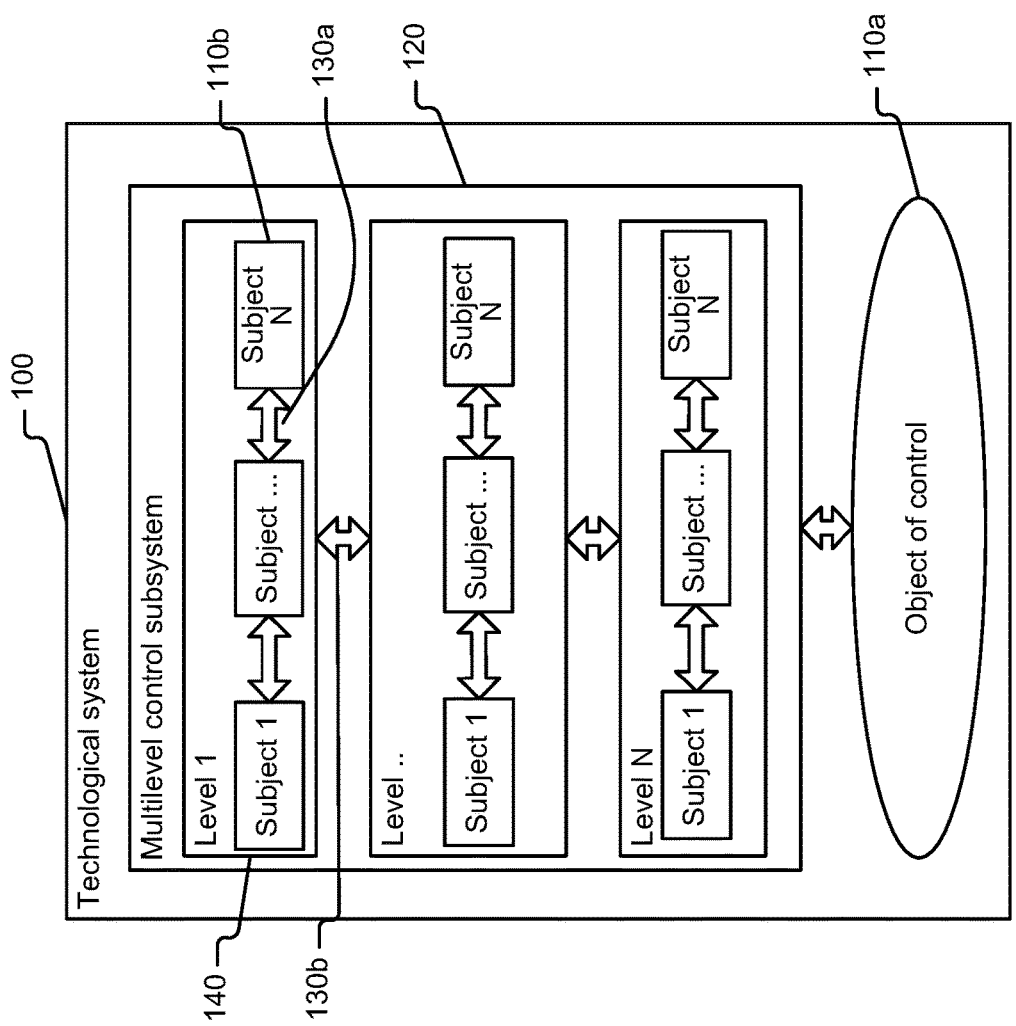
FIG. 1a schematically depicts an example of a technological system.

Example aspects are described herein in the context of systems, methods and computer program products for protection of a technological system (TS) from cyber attacks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Several definitions and concepts will be introduced next, which will be used in describing various exemplary aspects of the disclosed systems and methods.

The object of control is a technological object, against which external actions (controlling and/or perturbing it) are directed in order to change its state; in an exemplary aspect, such objects are a device or a technological process (or portion thereof).

A technological process (TP) is a process of material production involving the consecutive change of state of a material entity (the object of labor).

An external action is a method of changing the state of an element against which the action is directed (e.g., an element of a TS) in a particular direction, the action being transmitted from the element of the TS to another element of the TS in the form of a signal.

The state of the object of control is the totality of its essential attributes, expressed by parameters of state, which are changed or maintained under the influence of external actions, including control actions from a control subsystem. A parameter of state is one or more numerical values characterizing an essential attribute of an object; in a exemplary aspect, the parameter of state is a numerical value physical quantity.

The formal state of an object of control is the state of the object of control which corresponds to a technological chart and other technological documentation (in the case of a TP) or to a traffic schedule (in the case of a device).

A control action is a goal-oriented (the goal of the action is to act on the state of the object) legitimate (intended by the TP) external action on the part of the control subjects of the control subsystem on the object of control, leading to a change of state of the object of control or a maintaining of the state of the object of control.

A perturbing action is a goal-oriented or non-goal-oriented illegitimate (not intended by the TP) external action on the state of an object of control, including one on the part of a control subject.

A control subject is a device which sends a control action to an object of control or transmits a control action to another control subject for transformation prior to being sent directly to the object.

A multilevel control subsystem is a group of control subjects involving several levels.

A technological system (TS) is a functionally interconnected group of control subjects of a multilevel control subsystem and an object of control (TP or device), realizing a change of state of the object of control through changing the states of the control subjects. The structure of a technological system may be formed by the basic elements of a technological system (the interconnected control subjects of the multilevel control subsystem and the object of control), and also the connections between these elements. In the case when the object of control in a technological system is a technological process, the end goal of the control is: by changing the state of the object of control, to change the state of the object of labor (raw material, semifinished blanks, and so on). In the case when the object of control in a technological system is a device, the end goal of the control is to change the state of the device (a means of transportation, a spacecraft). The functional interconnection among the elements of a TS presupposes an interconnection among the states of these elements. There might not even be a direct physical connection between the elements, for example, there is no physical connection between actuators and a technological operation, but still the cutting speed is functionally connected to the speed of rotation of the spindle, even though these parameters of state are not physically connected.

The state of the control subject is the totality of its essential attributes, expressed by parameters of states being changed or maintained under the influence of external actions.

Essential attributes (and accordingly essential parameters of state) of a control subject are attributes having a direct influence on the essential attributes of state of the object of control. The essential attributes of the object of control are attributes having a direct influence on factors being monitored (accuracy, safety, efficiency) in the functioning of the TS. For example, conformity of cutting conditions with the formally specified conditions, the movement of a train in conformity with its schedule, the maintaining of a reactor temperature within allowable limits. Depending on the factors being monitored, one selects parameters of state of the object of control and, correspondingly connected to said parameters, the parameters of states of the control subjects exerting a control action on the object of control.

The state of an element of a technological system is the state of the control subject and the object of control.

The real state of an element of a technological system is the state of the element of the technological system at a certain point in time of an action on the object of control, determined by a measurement of the parameters of states and by intercepting signals (traffic) between the elements of the TS. The measurement of the parameters of state is done, for example, with the help of sensors installed in the TS.

The real state of a technological system is the totality of interconnected real states of the elements of the technological system.

A cybernetic block is an element of a cybernetic control system describing the process of the functioning (modeling the change in state) of an element of the technological system.

The ideal state of an element of the technological system (the state of the cybernetic block) is the state of the element of the technological system at a certain point in time of action on the object of control, determined by the cybernetic block as a result of modeling.

A cybernetic control system (CCS) is a totality of interconnected (connection of states) cybernetic blocks, modeling the change in the state of the technological system as a whole, the interconnection of the cybernetic blocks in the cybernetic control system repeating the interconnection of the corresponding blocks of elements in the technological system. The cybernetic blocks are connected by connections, a connection having the nature of a signal. A signal between cybernetic blocks is an ideal equivalent of an external action on an element in the TS, identical to the block (to the signal between elements of the TS).

The ideal state of a technological system (the state of the CCS) is the state of the technological system as determined by the cybernetic control system as a result of modeling.

The space of states is a method of formalization of the change in the states of a dynamic system (technological system or cybernetic control system).

A modeling error is an ideal state obtained as a result of modeling not conforming to the real state, while the real state conforms to the formally specified state. For example, the temperature in a furnace is 1000° C. (real state), the technology also calls for a temperature in the furnace of 1000° C. at the given point in time (formal state), but as a result of modeling the predicted temperature in the furnace at the given point in time should be 1200° C. Thus, the modeled value of the temperature in the furnace at the given point in time (the ideal state) is in error, or a modeling error has occurred.

FIG. 1A schematically depicts an example of a technological system 100, the TS includes the elements 110a and 110b, where the elements of the TS are: object of control 110a; control subjects 110b, forming a multilevel control subsystem 120; horizontal connections 130a and vertical connections 130b. The control subjects 110b are grouped by levels 140.

Figure 1B:
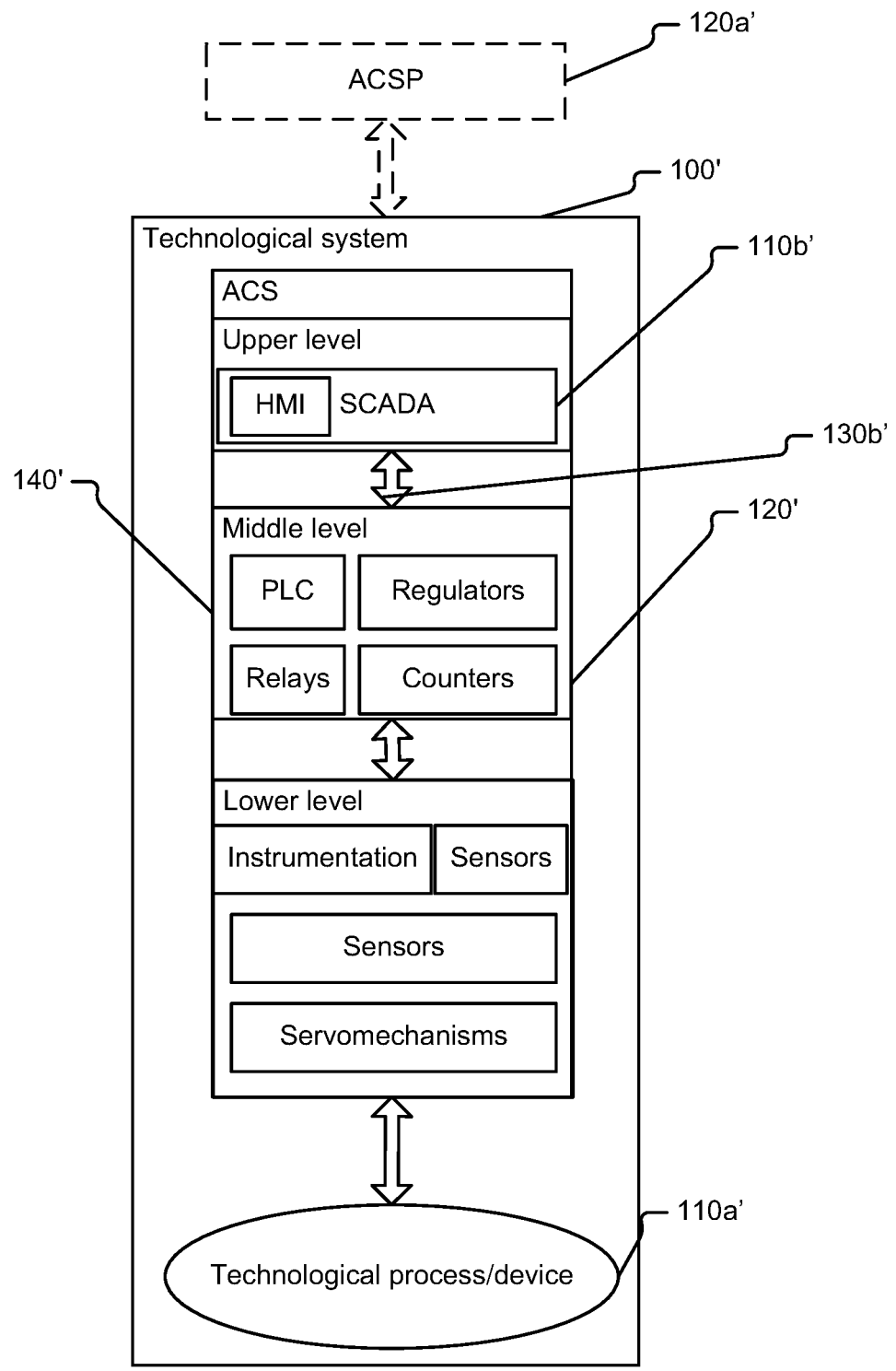
FIG. 1b schematically depicts an exemplary implementation of a technological system.

FIG. 1B schematically depicts an exemplary implementation of the technological system 100'. The object of control 110a' is a TP or a device, the object of control 110a' is subject to control actions which are worked out and implemented by an automated control system (ACS) 120', one distinguishes three levels 140' in the ACS, consisting of control subjects 110b' interconnected with each other by both horizontal connections along the horizontal (connections within a level, not indicated in the figure), and by vertical connections 130b' along the vertical (connections between levels). The interconnections are functional, i.e., in the general case a change in the state of the control subject 110b' on one level causes a change in the states of the control subjects 110b' connected to it on this level and other levels. Information on a change in the state of a control subject is transmitted in the form of a signal along the horizontal and vertical connections established between the control subjects, i.e., the information on a change in the state of a particular control subject is an external action with respect to the other control subjects 110b'. The levels 140' in the ACS 120' are identified in accordance with the designation of the control subjects 110b'. The number of levels can vary according to the complexity of the ACS 120'. Simple systems may contain one or more lower levels. Wireline networks, wireless networks, integrated microcircuits are used for the physical connection of elements of the TS (110a, 110b) and subsystems of the TS 100, while for the logical connection between elements of the TS (110a, 110b) and the subsystems of the TS 100 Ethernet, industrial Ethernet, and industrial networks are used. The industrial networks and protocols make use of various types and standards: Profibus, FIP, ControlNet, Interbus-S, DeviceNet, P-NET, WorldFIP, LongWork, Modbus and others.

The uppermost level (supervisory control and data acquisition level, SCADA) is the level of dispatch-operating control, including at least the following control subjects: controllers, control computers, human-machine interfaces (HMI) (in FIG. 1b shown in the context of one SCADA control subject). The level is intended for tracking of states of the elements of the TS (110a', 110b'), obtaining and accumulating information on the state of the elements of the TS (110a', 110b') and correcting these when needed.

The middle level (CONTROL level) is the level of controllers, including at least the following control subjects: programmable logic controllers (PLC), counters, relays, regulators. The control subjects 110b' of type "PLC" receive information from control subjects of "control and measurement equipment" type and control subjects 110b' of "sensor" type as to the state of the object of control 110a'. The control subjects of "PLC" type work out (create) a control action in accordance with a programmed control algorithm for the control subjects of "actuator" type. Actuators directly carry out this action (apply it to the object of control) at the lower level. A actuator is part of an actuating device (equipment).

The lower level (Input/Output level) is the level of such control subjects as sensors and measuring devices monitoring the state of the object of control 110a', as well as actuators. Actuators directly act on the state of the object of control 110a' to bring it into compliance with the formal state, i.e., the state corresponding to the technological assignment, the technological chart or another technological documentation (in the case of a TP) or the traffic schedule (in the case of a device). On this level there occurs the coordination of signals from the control subjects 110b' of "sensor" type with the inputs of the control subjects of middle level, and the coordination of the control actions worked out by the control subjects 110b' of "PLC" type with the control subjects 110b' of "actuator" type, which implement said actions. A actuator is part of an actuating device. An actuating device moves a regulating element in accordance with signals arriving from a regulator or control device. Actuating devices are the last connection in the chain of automatic control and in general consist of the blocks:

an amplifying device (contactor, frequency converter, amplifier, and so on);
a actuator (electric, pneumatic, hydraulic drive) with feedback elements (sensors of the output shaft position, signaling of end positions, manual drive, and so forth);
a regulating element (valves, gates, flaps, dampers, and so on).

Depending on the conditions of application, the actuating devices can have different designs. The main blocks of the actuating devices usually include actuators and regulating elements.

In a particular case, the actuating device as a whole is called a actuator.

Figure 2:
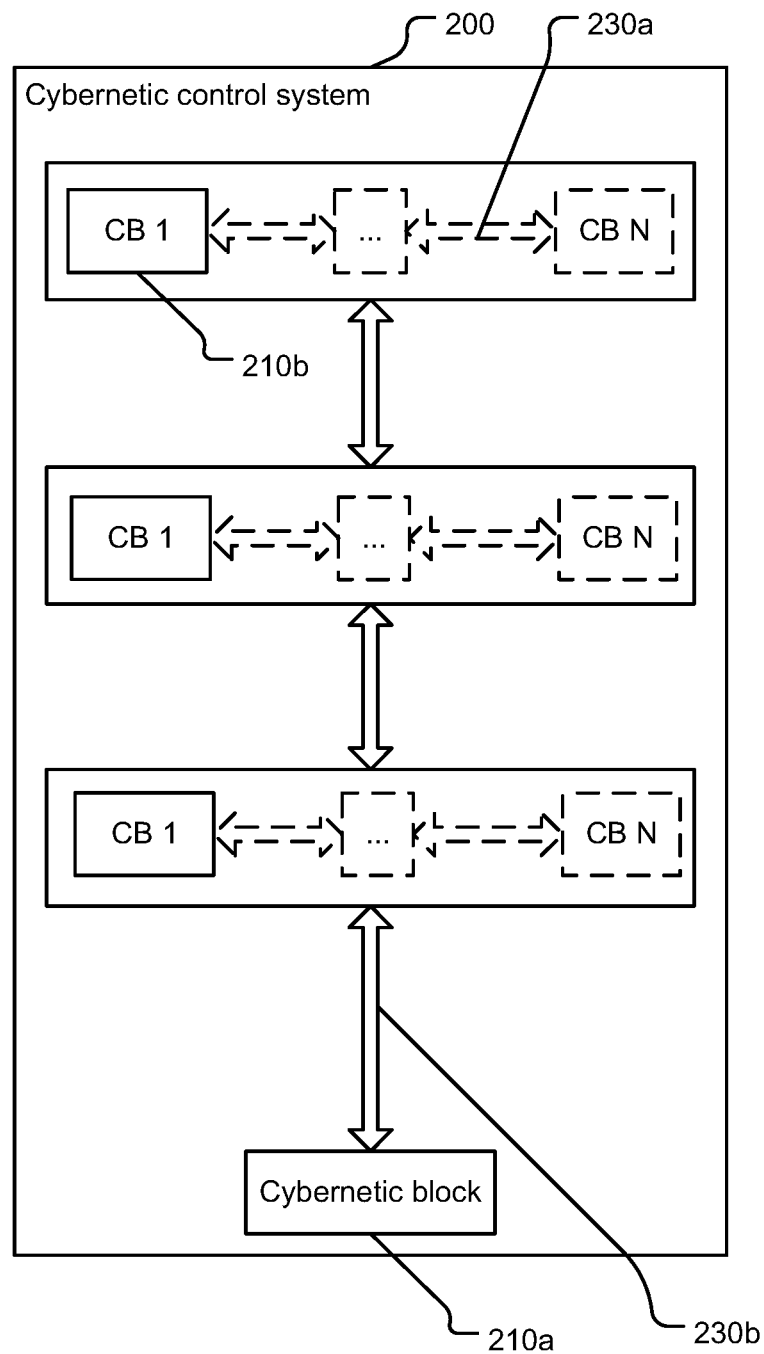
FIG. 2 schematically depicts an exemplary implementation of cybernetic control system.

FIG. 2 shows an exemplary implementation of a cybernetic control system (CCS) 200. The CCS consists of cybernetic blocks (CB) 210. The CCS 200 models a change in the state of a TS by modeling a change in the states of the elements of the TS (110a and 110b). Each cybernetic block 210 of the CCS corresponds uniquely (is identical) to an element of the TS. The horizontal connections 230a and vertical connections 230b between the cybernetic blocks correspond uniquely to the horizontal connections 130a and vertical connections 130b between identical elements of the TS (110a, 110b). The cybernetic block 210 establishes cause and effect relations (dependencies) between input and output signals. An input signal of a cybernetic block 210 is an output signal of a cybernetic block 210 occupying a logically or structurally higher position as compared to the particular cybernetic block 210. In a particular case for the cybernetic blocks 210 of the upper level, the input signal is a feedback signal from a block of the lowest level. For example, the cybernetic block is one which describes the processes of an electric heating furnace. The input signal of this block is information about the voltage of a heater (the voltage of the heater is a parameter of state of the heater), while the output signal of this block is information about the furnace temperature (the furnace temperature is a parameter of state of the furnace); the relation between the input and the output is described by a functional operator (a differential equation). The output signal of the CB 210 is uniquely defined by the state of the given CB 210, i.e., the parameters of state of the CB 210 and the output signal are functionally or correlatively interconnected, and in turn the parameters of state are uniquely defined by the input signal (the control action); thus, to describe the CB 210, one of the forms of describing the relationship between the input and output parameters is used, and such forms are models. There are various model types and accordingly modeling methods (descriptions of a cause and effect relationship). In defining the modeling method one may choose between at least:

a mathematical model;
a logic model;
a numerical model;
a physical model;
a simulation model;

In selecting the modeling method, one may take into account at least the following criteria:

the nature of the element of the TS (110a or 110b) of which the change of state is being modeled by the cybernetic block;
the required modeling accuracy (permissible deviation of the modeled processes from the real processes) for the change in the states of the element of the TS (110a or 110b);
the set of initial data on the elements of the TS (the number of elements of the TS, the type of elements of the TS, the method of physical and logical relationship between the elements of the TS and so forth);
the complexity of the formal description of the processes in the technological system 100, where the process is a change in the state of the elements of the technological system (simulation models and accordingly the correlation connections between CBs are used in those conditions when it is not possible or relatively difficult to describe uniquely a system or its behavior with the help of mathematical formulas).

Therefore, the CCS 200 may include cybernetic blocks 210 making use of different models. Also, more than one model can be used for a cybernetic block 210, and depending on the situation a choice is made between one or another ready (trained) model for a cybernetic block (described below). In a particular case, the data-driven approach may be used for the training, in another case a formal description of the technological process and the technological system may be used (technological documentation, program projects, description of finite-state and cell type automata, and so on).

Figure 3:
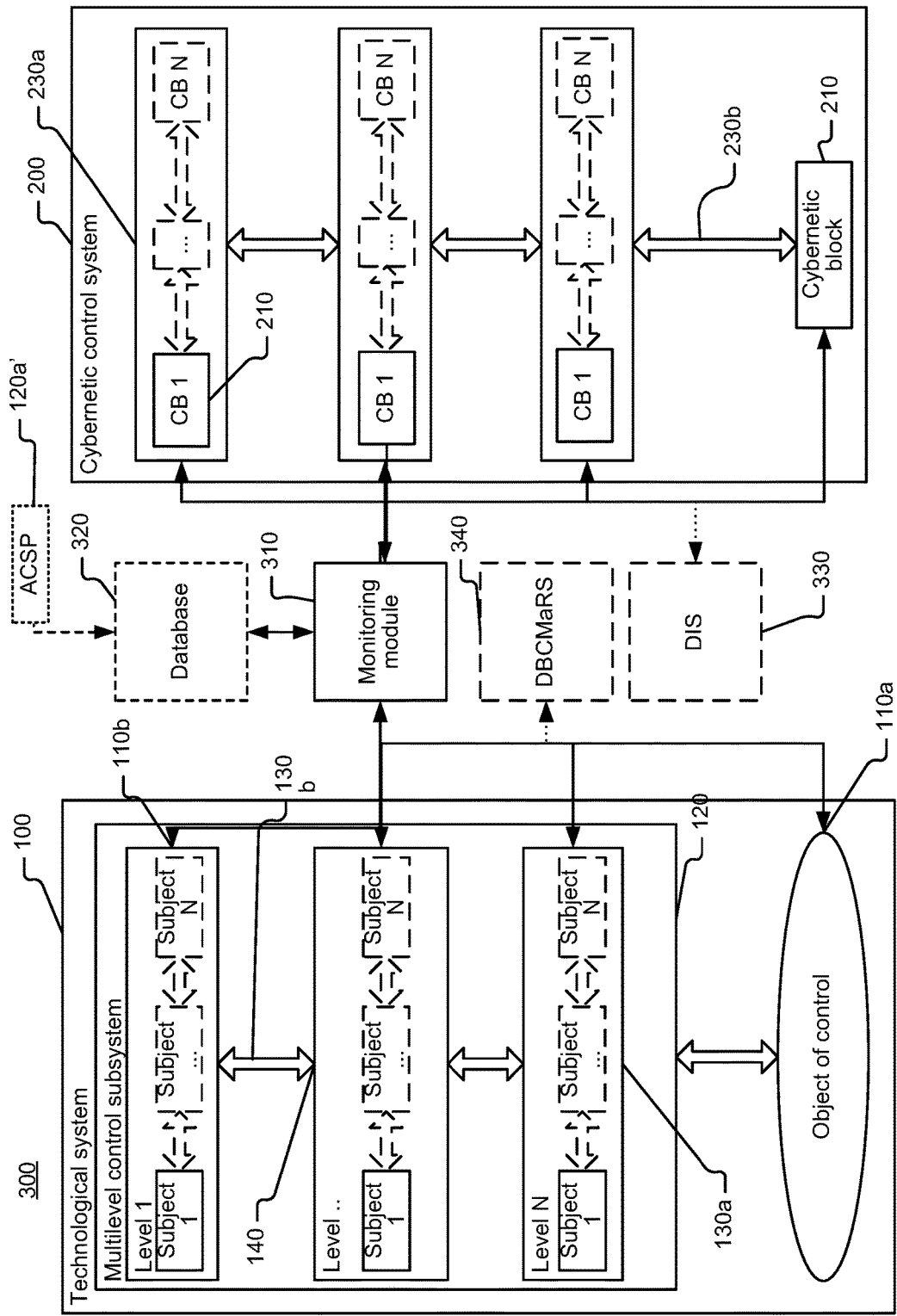
FIG. 3 schematically depicts a exemplary implementation of system of monitoring the functioning of a technological system.

FIG. 3 shows one exemplary implementation of the monitoring system 300. The monitoring system 300 is designed to monitor the functioning of a TS 100 by means of a CCS 200 during the realization of control actions by the control subjects 110b of a multilevel control subsystem 120 of the TS 100 on the object of control 110a. The control subjects 110b and the object of control 110a here are functionally interconnected elements of the technological system 100, while the totality of functionally interconnected states of the control subjects 110b and the object of control 110a determine the real state of the TS 100 at a moment in time. The monitoring system 300 contains the TS 100, realizing a change in the state of the object of control 110a through a change in the states of the control subjects 110b, while the TS 100 provides a functionally interconnected set of elements, specifically: the object of control 110a; and the control subjects 110b, forming a multilevel control subsystem for the object of control 120.

The monitoring system 300 may also contain a CCS 200, consisting of interconnected cybernetic blocks 210, where each CB 210 individually models the change in the state of an individual element of the TS (110a or 110b), the relationship of the cybernetic blocks 210 in the CCS 200 duplicating the interconnection of the elements of the TS (110a, 110b) of which the change in state is being modeled by the blocks, but unlike the interconnections in the TS 100 (the dependencies of the state of one element of the TS on the state of another element of the TS) the interconnections between the blocks in the CCS 200 can be of a correlative nature, a functional nature, or a hybrid nature (some blocks correlatively, others functionally connected). The CCS 200 may be used within the monitoring system 300 to:

- determine the ideal state of the technological system and its elements for a point in time by modeling; wherein, in a particular case, the modeling process itself may be carried out continuously, and the results are stored in a database of ideal states (DIS) 330, while the state for a point in time is provided on request submitted to the DIS 330;
- determine the ideal state of the elements of the TS by modeling for a given state of one of the elements of the TS;

The monitoring system 300 may contain a monitoring module 310, connected to the TS 100 and to the CCS 200, being designed to:

- obtain the real state of the TS and its elements at an arbitrary point in time or continually, where the state of the TS is determined by the set of states of its elements; wherein for a continuous obtaining of the real states of the elements of the TS the results may be entered into a database of assignment of control methods in the technological system and real states (DBCMaRS) 340, while the state is provided for the point in time by request sent to the DBCMaRS 340;
- initialize the CCS 200 by synchronizing the CCS 200 with the TS 100 in terms of time or in terms of state of one of the elements of the technological system;
- compare the obtained real state of the TS 100 and its elements with the ideal state of the TS 100 and its elements as determined by the CCS 200;
- discover, based on the comparison, a deviation of the real state of the TS 100 from the ideal state of the TS 100 as determined by the CCS 200;
- check the integrity of the functional interconnection of the states of the elements of the TS (110*a*, 110*b*), where the ideal state of the control subjects of the TS 110*b* as determined by the CCS 200 for a given state of the object of control 110*a* may be compared with the real state of the control subjects of the TS 110*b* for the same state of the object of control 110*a*;
- determine that the ideal state of the TS 100 as determined by the CCS 200 for the point in time is a modeling error on the basis of a confirmed sustained functional interconnection between the elements of the technological system (110*a*, 110*b*);
- end the testing of the cybernetic control system 200;
- discover anomalies in the monitored TS 100 on the basis of the disturbed functional interconnection between the elements of the technological system (110*a*, 110*b*).

In one exemplary aspect, the monitoring module 310 before initializing the CCS 200 selects the models (modeling method) that will be initialized from the available ones for each cybernetic block 210. For example, a mathematical one, a simulation one, and so on. The choice is done on the basis of the aforementioned criteria, the criteria for each case being indicated in the technical assignment (product requirements document, PRD) in the form of quality requirements (monitoring accuracy, monitoring efficiency, monitoring speed, and so on) for the monitoring system 300 and the essential attributes of the elements of the TS (110*a*, 110*b*) which need to be monitored. The technical assignment is stored in formalized form in the database 320.

The monitoring system 300 may also maintain a database 320 storing a formal description of the changes in state of the object of control 110*a*. The formal description of such an object of control 110*a* as a technological process, for example, can be formalized (transformed from one form of representation of information, for example, in the form of electronic technological documentation, to another form understandable to the monitoring system 300, for example into a database or a space of states) on the basis of the technological documentation arriving from the automated enterprise control system (AECS) 120*a'*, and kept in the database 320 in the form of the space of states. The space of states is a particular method of formalizing a change in the state of the object of control 110*a*.

In addition, the DBCMaRS 340 may store information on all actions changing the state of the TS 100 and its elements. The DBCMaRS 340 is connected to both the monitoring module 310 and the TS 100.

The possibility of obtaining (measuring, recording) the real states of the elements of the TS (110*a*, 110*b*) and obtaining information on the external actions is afforded by the connections of the monitoring module 310 of the monitoring system 300 to the control subjects 110*b* and to interceptors (not shown in the figures) installed on the horizontal connections 130*a* and the vertical connections 130*b*. They may be realized by software, hardware, and firmware. The interceptors intercept signals (traffic) between the elements of the TS. Interceptors (in the form of agents) may be also installed at the HMI and intercept keyboard entry, pressing of buttons, and the operator's response to a certain event in the technological system. They also obtain the states from monitoring systems (for example, in many PLC the state of tags can be recorded by SNMP or HTTP), from event logs, messages, and application logs, and so on. In the general case, the interceptors do not slow down the functioning of the elements of the TS (110*a*, 110*b*) and the interception occurs with no delays.

Figure 4:
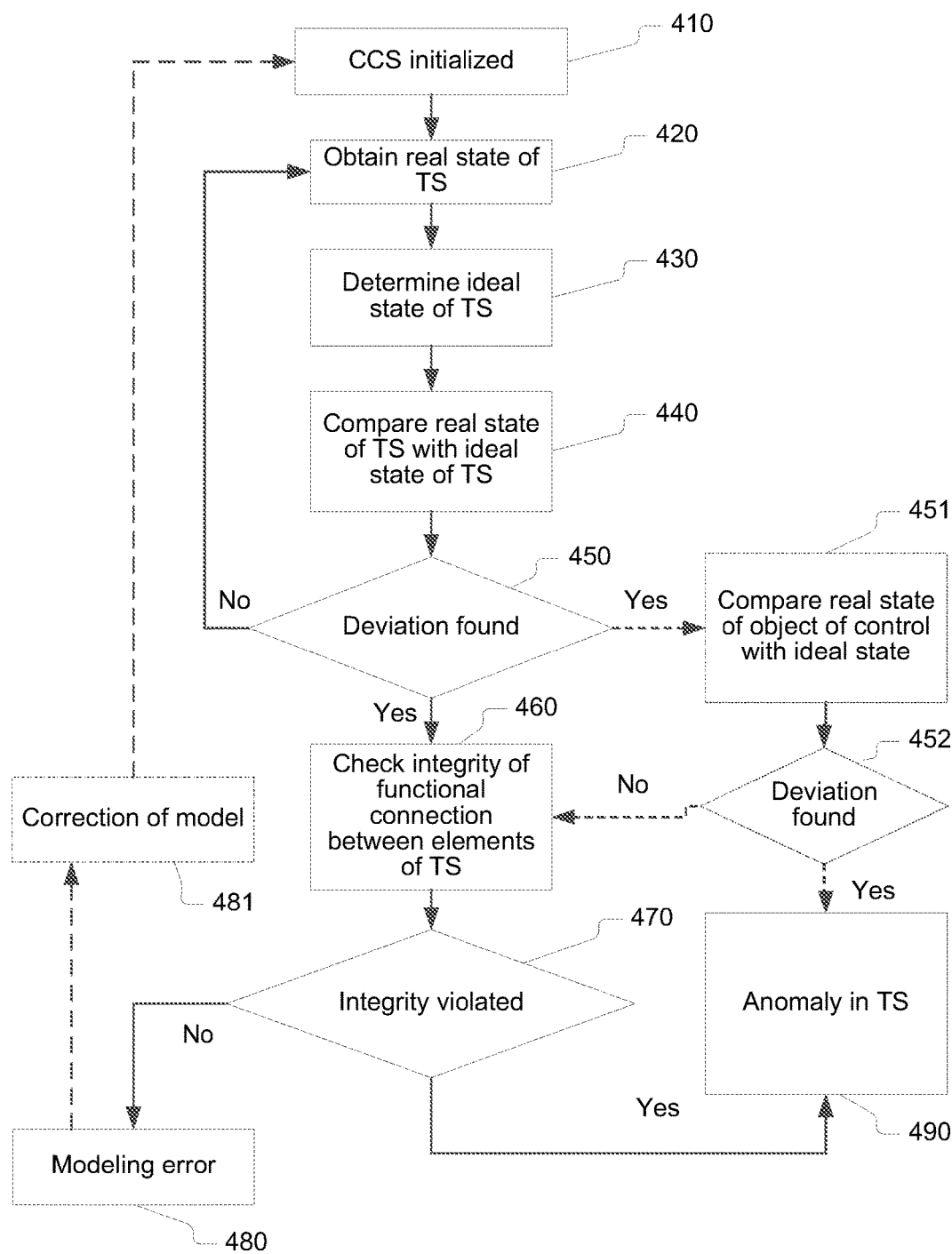
FIG. 4 depicts an exemplary method of operation of the monitoring system.

FIG. 4 shows one exemplary method of operation of the monitoring system 300. The monitoring system 300 works in two modes: a mode of testing the CCS 200 for the occurrence of errors in the modeling and a mode of testing the TS for detection of anomalies (deviations from normal functioning) in the functioning of the TS. Both modes may work in parallel in the process of realization of the control actions by the control subjects 110*b* of the multilevel control subsystem 120 of the TS 100 on the object of control 110*a*. The control subjects 110*b* and the object of control 110*a* here are functionally interconnected elements of the TS 100, while the set of functionally interconnected states of the control subjects 110*b* and the object of control 110*a* determine the real state of the TS 100 at the point in time. In step 410 the CCS 200 is initialized by synchronizing the CCS 200 with the TS 100 in time. Since the CCS model is an ideal description of the real processes in the TS 100, the states of the TS 100 (the real state) and the state of the CCS 200 (the ideal state) should coincide as a result of the initialization. A deviation of the values of the real states from the corresponding values of the ideal states is permissible, where the permissibility is established on the basis of the technical assignment for the monitoring system, and the value of the deviation is computed as:

$$\frac{|Q_{id} - Q_r|}{Q_{id}} < \Delta, \text{ where}$$

Qid is the ideal state of the technological system (the state of the CCS);
Qr is the real state of the technological system;

Δ is the permissible deviation.

Thus, synchronization is a juxtapositioning of the spaces of states of the TS 100 and the CCS 200. In the described case, the initialization is done by juxtapositioning the space of states of the TS 100 and the space of states of the CCS 200 in terms of one of the parameters of state, namely, the time. The synchronization of the whole CCS 200 is done by synchronizing each cybernetic block 210 of the CCS 200 with its identical element of the TS (110*a* or 110*b*).

Next, in step 420, the real state of the technological system 100 and its elements (110*a*, 110*b*) are obtained at an arbitrary point in time, and in step 430 the ideal state of the technological system 100 and its elements (110*a*, 110*b*) are determined for that same point in time by the modeling carried out by the CCS. The ideal state of the TS 100 will be the state of the CCS 200 for that same point in time, since both systems are supposed to function synchronously, and the CCS 200 is isolated from external actions, unlike the TS 100. Therefore, the state obtained from the TS 100 is the real state of the TS 100 (subjected to perturbing actions), while the state as determined by the CCS 200 is the ideal state of the TS 100 (not subjected to perturbing actions). After obtaining the real state in step 420 and determining the ideal state of the TS 100 in step 430, these states are compared in step 440 (the parameters of the states are compared). For the comparison, the set of parameters of the states should be expressed in a defined manner. The set of parameters can be expressed in the form of an unordered set of parameters of the states, an ordered set (tuple) of parameters of the states, or a function, the value of which will reflect the state of the system. For example, when discussing an object of control such as a technological operation of machining on a lathe, its state is characterized by the following parameters of state: the cutting depth (t), the feed (s) and the cutting speed (V). Accordingly, the set can be represented in the form of an unordered set (t,s,V), an ordered set (tuple) <t,s,V> or a capacity P(t,S,V) which is a function of the aforementioned parameters of state. Accordingly, the state of the technological system 100 is the totality of states of the elements of the TS (110*a*, 110*b*) expressed in a particular manner. In turn, the state of the TS 100 can be expressed in the form of a sequence (either ordered or unordered) or a function of states of the elements of the TS (110*a*, 110*b*).

After comparing in step 440 the obtained real state of the technological system 100 to the ideal state of the technological system 100 as determined by the cybernetic control system 200 for the same point in time, if a deviation has been found (step 450), the integrity of the functional interconnection between the states of the elements of the TS in step 460 is checked, or else one returns to step 420.

Figure 5:
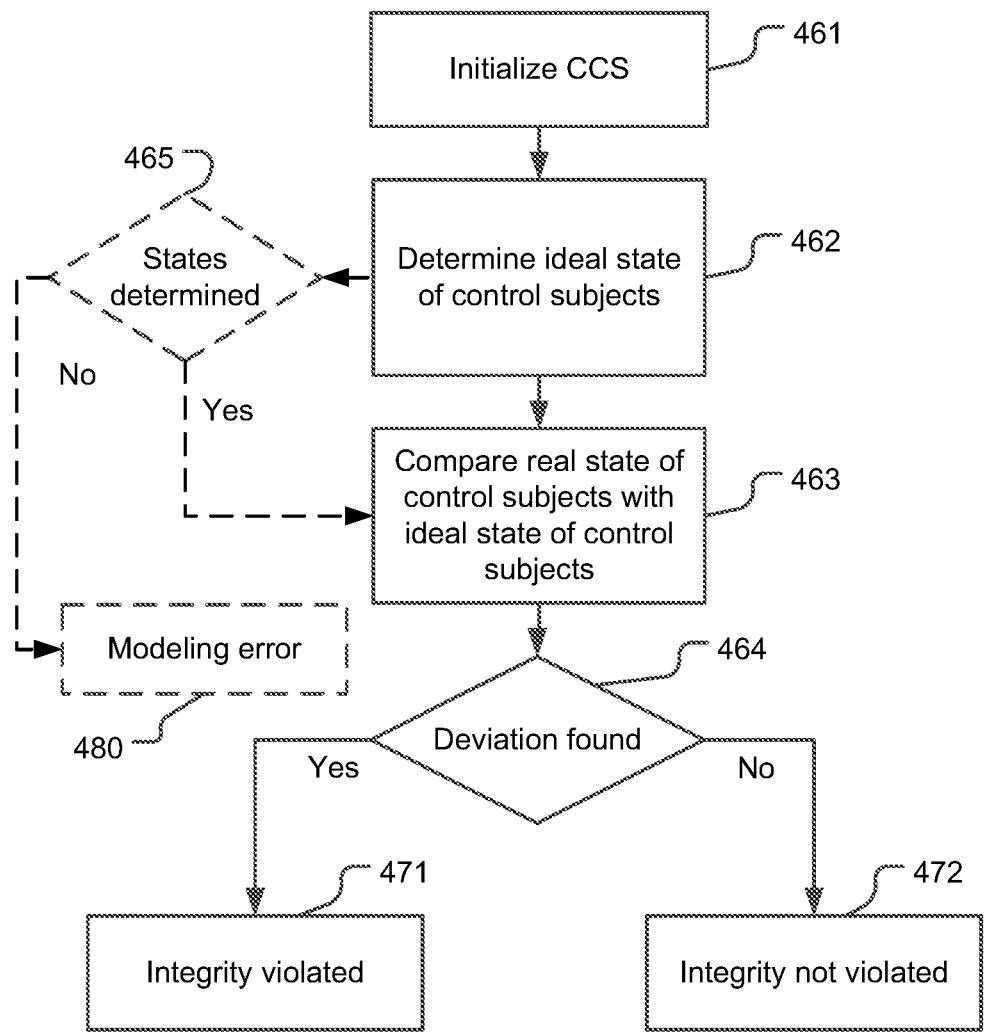
FIG. 5 depicts an exemplary method of checking the integrity of the functional interconnection of the states of the elements of a technological system.

The checking of the integrity of the functional interconnection between the states of the elements of the TS (110*a*, 110*b*) is based on the unity of states of the elements of the TS (110*a*, 110*b*). As indicated above, the elements of the TS (110*a*, 110*b*) are interconnected, and the relationships are functional, i.e., in the general case a change in the state of a control subject 110*b* at one level causes a change in the states of the control subjects 110*b* connected to it on the same and other levels, as well as of the object of control 110*a*. During normal functioning of the TS 100 the interconnection should not be disrupted, i.e., the unity of states of the elements of the TS (110*a*, 110*b*) should be preserved and at a point in time all states of the elements of the TS (110*a*, 110*b*) should be strictly determined and interconnected. FIG. 5 depicts a way of checking the integrity of the functional interconnection of the states of the elements of the TS (110*a*, 110*b*). In step 461 the CCS 200 is initialized by the real state of the object of control 110*a*, obtained in step 420. As a result of the initializing of the CCS 200 by the real state of the object of control, the ideal state of the control subjects 110*b* (step 462) is determined by modeling carried out by the cybernetic control system 200 for a given state of the object of control 110*a*. In step 463 the ideal states determined by the CCS 200 for the control subjects of the TS 110*b* are compared to the real states of the control subjects of the TS 110*b* that were obtained in step 420.

In this case, if as a result of the comparison of the ideal states of the control subjects of the technological system 110*b* as determined by the CCS 200 for a given state of the object of control 110*a* in step 462 with the real states of the control subjects of the TS 110*b* obtained in step 420 no deviations are discovered (or they are permissible), the functional interconnection between the elements of the TS (110*a*, 110) is confirmed as sustained (the unity of states has not been violated). Thus, the deviation found in step 450 is a modeling error and, accordingly, the ideal state of the TS 100 as determined by the CCS 200 in step 430 is considered a modeling error. The testing of the CCS is ended for the subsequent correction of the models (step 481) of the CB 210 (further training or retraining), while other models are chosen for the testing of the CCS 200 (step 410). In a particular case, the model of the CB 210 of the CCS 200 that caused the modeling error is identified, and the model of the given CB 210 is corrected or replaced, the models for the other CBs 210 being saved unchanged. The indicated CB 210 is determined by alternating comparison of the real states of the control subjects 110*b* obtained in step 420 with the ideal states of the control subjects 110*b* determined in step 463.

In the event that a deviation is discovered (or is above the permissible) as a result of the comparison of the ideal states of the control subjects of the technological system 110*b* as determined by the CCS 200 for a given state of the object of control in step 462 with the real states of the control subjects of the TS 110*b* obtained in step 420, the functional interconnection between the elements of the TS (110*a*, 110*b*) is identified as disturbed (the unity of states is violated and an absence of a functional interconnection is confirmed), and the deviation discovered in step 450 testifies to a deviation of the TS 100 from normal functioning, i.e., an anomaly is discovered in the TS 100.

Figure 6:
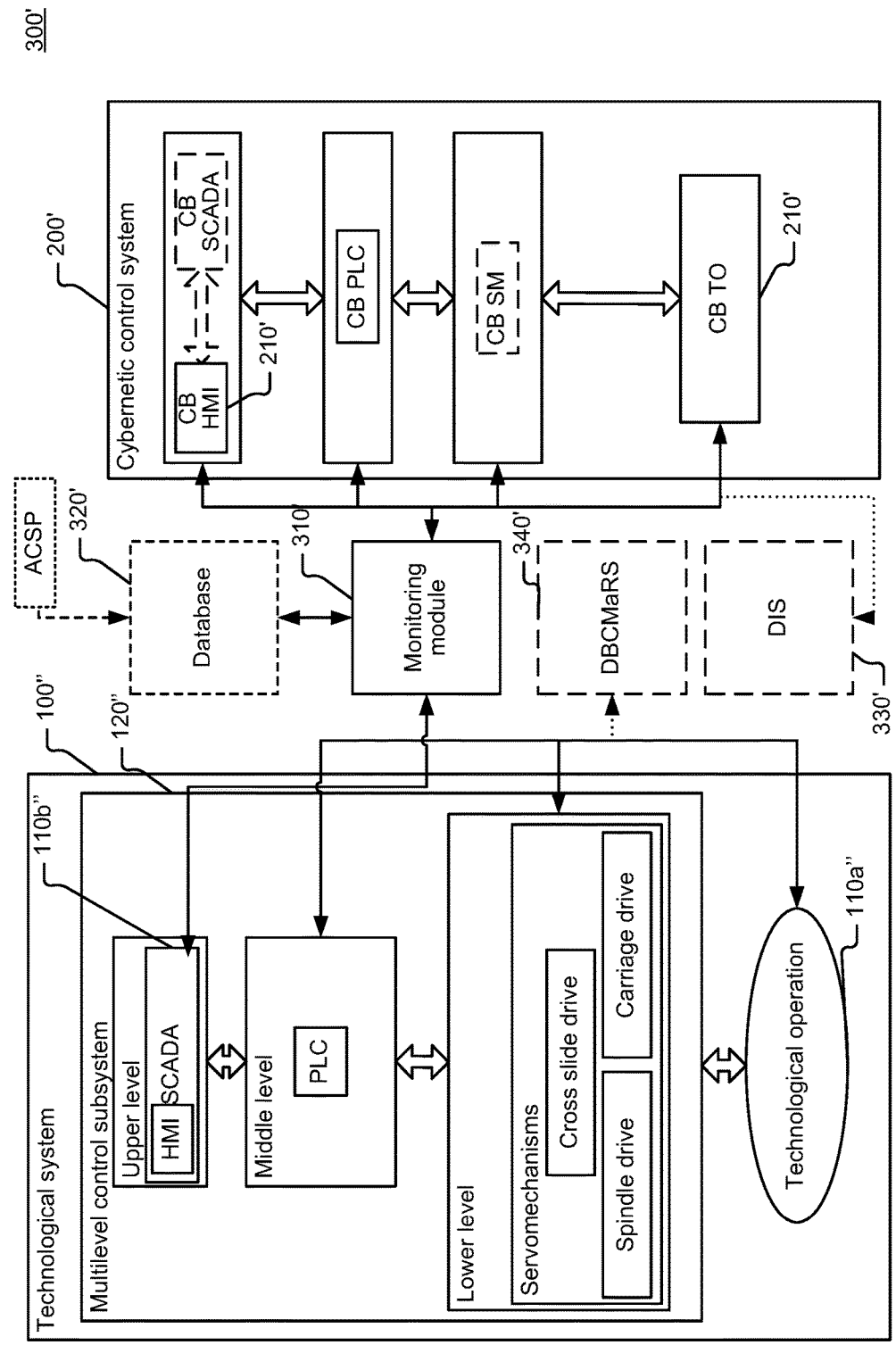
FIG. 6 depicts an exemplary implementation of the monitoring system.

FIG. 6 shows an example of a monitoring system 300' which is designed to exercise control over the functioning of a TS 100" by means of a CCS 200'.

The monitoring system 300' contains an example of the TS 100". In the TS 100" the following control subjects 110*b*" are identified: SCADA, HMI, PLC, actuators (SM) of a lathe, especially the spindle drive, the drive for the longitudinal movement of the carriage, and the drive for transverse feed (the drive for movement of the cross slide of the carriage). The SCADA and the HMI form the upper level of a multilevel control subsystem 120", the PLC forms the middle level of the control subsystem, the actuators form the lower level of the control subsystem. The object of control 110*a*" is a technological operation of lathe machining. The control subjects 110*b*" and the object of control 110*a*" are characterized by a number of essential attributes, i.e., attributes important from the standpoint of exercising control over the functioning of the TS 100", changing which attributes alters the course of the functioning of the TS 100" and accordingly is reflected in the factors of the functioning. The totality of essential attributes of the control subjects 110*b*" or the object of control 110*a*", as expressed by the parameters of state, is accordingly the state of the subject of control 110b" or the state of the object of control 110a". The monitored factor of functioning of the TS 100" in the context of the technological operation is the accuracy and safety, and specifically the conformity of the cutting conditions to the formally specified conditions and the conformity of the cutting power (P) to the maximum allowable power. Consequently, the parameters of state of the object of control are the feed (s), the cutting speed (V), the cutting depth (t) and the power (P). The parameters of the states for the control subjects of the actuator type are respectively: the frequency of rotation of the spindle drive (directly influencing the cutting speed), the frequency of rotation of the drive for the longitudinal movement of the carriage (directly influences the feed), the frequency of rotation of drive for the transverse movement of the cross slide of the carriage (directly influences the cutting depth). The parameters of the states for the other control subjects 110b" are represented abstractly for the purposes of simplicity of the present example:

$S(s_1,s_2,s_3)$, where $s_i$ are certain parameters of states expressing essential attributes of the SCADA, the state of the SCADA at the point in time is $S(t_s)$, where $t_s$ is the time;

$H(h_1,h_2,h_3)$, where $h_i$ are certain parameters of states expressing essential attributes of the HMI (information being displayed and commands), the state of the HMI at the point in time being $H(t_H)$, where $t_H$ is the time;

$P(p_1,p_2,p_3)$, where $p_i$ are certain parameters of states expressing essential attributes of the PLC (states of tags and of registers), the state of the PLC at the point in time being $P(t_p)$, where $t_p$ is the time;

$M(n_s,n_c,n_{cs})$, where $n_i$ are certain parameters of states expressing essential attributes of the actuators ($n_s$ is the frequency of rotation of the spindle drive, $n_c$ is the frequency of rotation of the drive for the longitudinal movement of the carriage, $n_{cs}$ is the frequency of rotation of the drive for the transverse movement of the carriage cross slide), the state of the actuators at the point in time being $M(t_M)$, where $t_M$ is the time;

O(P (s,V,t)) is the designation of the given parameters of states described above, $O(t_o)$ is the state of the object of control at the point in time;

$Q(S(t_s), H(t_H), P(t_p), M(t_M), O(t_o))$ is the state of the TS, where $t_s=t_H=t_p=t_M$.

The states of the control subjects and the object of control are functionally interconnected and there is a superpositioning (composition) of the functional interconnections (representations) of the states and inverse functional interconnections (representations) of states, as well as transitivity. For example, if $P(t_p)=\phi_1[S(t_s),t]$ and $M(t_M)=\phi_2[P(t_p),t]$, then $M(t_M)=\phi_3[S(t_s),t]$, and $S(t_s)=\phi_3^{-1}[M(t_M),t]$.

This is valid for the same point in time, $t=t_s=t_H=t_p=t_M$

The monitoring system 300' also contains the CCS 200', consisting of interconnected cybernetic blocks 210', where each CB 210' separately models the change in the state of a separate element of the TS (110a' or 110b'), the interconnection between the cybernetic blocks 210' in the CCS 200' duplicating the interconnection between the elements in the TS (110a', 110b'), the change in the state of which elements is being modeled by the blocks. The number of cybernetic blocks 210' in the CCS 200' corresponds to the number of elements of the TS (110a' and 110b'). Various models are used for the modeling (determining of the states of the elements) of the CB, and accordingly a hybrid method is used for the connections (dependencies between the states of the elements). In a particular case, a mathematical model is used in the CB TO in the example being considered, while for all other blocks simulation models are used. Accordingly, the connection between CB TO and CB SM is functional, all other connections being correlative. The simulation models first need to be trained. In the most simple aspect, the training is a memorization of states of the elements of the TS (data-driven learning) for points in time over the course of the realization of the technological operations, the interval of time being equal to 0.5 s, for example. The results memorized are kept in the database DIS 330'. As a result, we obtain the states of the elements of the TS.

| t, seconds | S | H | P | M |
|---|---|---|---|---|
| 0 | $S_1$ | $H_1$ | $P_1$ | $M_1$ |
| 0.5 | $S_2$ | $H_2$ | $P_2$ | $M_2$ |
| 1.0 | $S_3$ | $H_3$ | $P_3$ | $M_3$ |
| 1.5 | $S_4$ | $H_4$ | $P_4$ | $M_4$ |
| 2.0 | $S_5$ | $H_5$ | $P_5$ | $M_5$ |
| ... | $S_{...}$ | $H_{...}$ | $P_{...}$ | $M_{...}$ |
| n | $S_n$ | $H_n$ | $P_n$ | $M_n$ |

As a result, the operation of the simulation model in a particular case constitutes a consecutive changing of the states (a finite-state automaton or a cell automaton) with a defined tempo (determined by the measurement interval during training or by the periodicity of carrying out the steps 420-450, FIG. 4). The state of the object of control is determined on the basis of the state of the actuators, since in the given case the aforementioned states have functional dependencies $O_i(M_i)=\phi[M_i]$.

CB HMI: $H_1 \to H_2 \to H_3 \to H_4 \to H_5 \to H \ldots \to H_n$
CB SCADA: $S_1 \to S_2 \to S_3 \to S_4 \to S_5 \sqrt[3]{S} \ldots \to S_n$
CB PLC: $P_1 \to P_2 \to P_3 \to P_4 \to P_5 43\ P \ldots \to P_n$
CB SM: $M_1 \to M_2 \to M_3 \to M_4 \to M_5 \to M \ldots \to M_n$
CB TO: $O_1(M_1) \to O_2(M_2) \to O_3(M_3) \to O_4(M_4) \to \ldots \to O_n(M_n)$ Upon identifying modeling errors, the simulation model is further trained/corrected (described below) or, in other words, states not previously memorized or taught are added. Thus, for functional connections, the states of the connected elements are determined in advance; for correlative connections, the states of the connected elements are not known in advance, and in such cases a preliminary teaching is necessary.

Let us consider the mode of operation of a monitoring system 300', the CCS 200' of which has been previously trained; the general type of the method is shown in FIG. 4. The CCS 200' is initialized, in one particular case taking the point in time of the operation in which the CCS is synchronized, and for this point in time we obtain the states of the elements of the TS 110a' and 110b' from the DIS 200' and start the running of the CCS 200'. For example, the model is initialized 1.5 seconds (synchronization in time) from the start of the operation, and therefore we obtain $S_4$, $H_4$, $P_4$, $M_4$ from DIS 320' and start the model:

CB HMI: $H_4 \to H_5 \to H \ldots \to H_n$
CB SCADA: $S_4 \to S_5 \to S \ldots \to S_n$
CB PLC: $P_4 \to P_5 \to O \ldots \to P_n$
CB SM: $M_4 \to M_5 \to M \ldots \to M_n$
CB TO: $O_4(M_4) \to O_5(M_5) \to \ldots O_n(M_n)$ In another particular case, the monitoring module 310' obtains the state of one of the elements of the TS (synchronization in state) at the point in time of the operation at which the synchronization is done, and we obtain the corresponding states of the elements of the TS from DIS 320'. For example, the monitoring module 310' has obtained a value of the state of the control subject of PLC type equal to or acceptably close (acceptability being determined by a threshold) to the value $P_3$, therefore we obtain $S_3$, $H_3$, $M_3$ from DIS 320' and start the model:

CB HMI: $H_3 \rightarrow H_4 \rightarrow H_5 \rightarrow H \ldots \rightarrow H_n$
CB SCADA: $S_3 \rightarrow S_4 \rightarrow S_5 \rightarrow S \ldots \rightarrow S_n$
CB PLC: $P_3 \rightarrow P_4 \rightarrow P_5 \rightarrow P \ldots P_n$
CB SM: $M_3 \rightarrow M_4 \rightarrow M_5 \rightarrow M \ldots \rightarrow M_n$
CB TO: $O_3(M_3) \rightarrow O_4(M_4) \rightarrow \ldots \rightarrow O_n(M_n)$ After initialization the models are started, and the CCS 200' functions synchronously with the TS 100". The monitoring module 310' then obtains the real state of the TS (step 452, FIG. 4), for this the monitoring module 310' obtains the real state of all the elements of the TS: $S_r, H_r, P_r, M_r, O_r$, and then the state of the TS will be equal to $Q_r(S_r, H_r, P_r, M_r, O_r, t)$ (real state of the TS 100"). The monitoring module 310' then determines the ideal state of the TS 100" by obtaining the ideal states of the elements of the TS: $S_{id}, H_{id}, P_{id}, M_{id}, O_{id}$ from each cybernetic block of the CCS 200', and then the ideal state of the TS 100" is equal to $Q_{id}(S_{id}, H_{id}, P_{id}, M_{id}, O_{id}, t)$. The ideal state $Q_{id}$ of the TS 100" and the real state $Q_r$ of the TS 100" are compared; in the event that the states coincide ($Q_r = Q_{id}$), or if the deviation of the real state $Q_r$ of the TS 100" from the ideal state $Q_{id}$ of the TS 100" does not exceed an allowable deviation ($\Delta$), such as one equal to 0.05, the monitoring continues. The allowable deviation ($\Delta$) here is calculated according to the formula:

$$\frac{|Q_{id} - Q_r|}{Q_{id}} \leq \Delta.$$

But if the states do not coincide, or the deviation exceeds the allowable threshold, one clarifies the reason for the deviation. There may be at least two reasons for the deviation: a modeling error or an anomaly in the TS 100". To determine the reason, one compares first of all the real state of the object of control ($O_r$) with the formal state of the object of control ($O_f$) (step 451, FIG. 4), the formal state of the object of control being obtained from DIS 320'. If the states do not coincide, or the deviation exceeds the allowable deviation:

$$\frac{|O_f - O_r|}{O_f} \leq \Delta,$$

then the real cutting conditions do not conform to the cutting conditions specified by the technology (formal cutting conditions), and this means that an anomaly has occurred in the TS 100". The cause of the anomaly is a perturbing action on one of the elements of the TS, and this action influences the monitored factors of the functioning.

In the case when the states coincide, or the deviation does not exceed an allowable deviation, one checks the integrity of the functional interconnection between the elements of the TS (step 460, FIG. 4). For this, the CCS 200' is again initialized, using for the initialization the real state of the object of control $O_r$ obtained in step 420, since it has been previously verified (step 452, FIG. 4) that this state corresponds to the specified state (the formal state). In a particular case, one can also use the real state of another element of the TS, if it is known for certain that the given element was not subjected to a perturbing action, and also no elements situated higher up in the hierarchy were subjected to a perturbing action. In this case, the procedure for initialization and modeling for the CCS 200' is as follows:

obtaining the real state of the object of control $Q_r$;

determining the ideal state $M_{id}$ of the control subject of "actuator" type on the basis of the dependency $O_i(M_i) = \phi[M_i]$, from which $M_{id}(O_r) = \phi^{-1}[O_r]$;

discovering in DIS 320' among the memorized states of the control subjects of "actuator" type ($M_i$) a certain value $M_{id}$ (or the closest value, proximity being determined by allowable discrepancy and being equal, for example, to 0.96), this value corresponding for example to $M_2$;

determining the states of other control subjects connected to the discovered $M_i$, namely, $S_i, H_i, P_i$, for example for $M_2$ these are the states $S_2, H_2, P_2$ (they will be the ideal states $S_{id}, H_{id}, P_{id}, M_{id}$ of the control subjects);

After the determination, the ideal states of the control subjects $S_{id}, H_{id}, P_{id}, M_{id}$ are compared pairwise with the previously obtained (step 452, FIG. 4) real states of the control subjects $S_r, H_r, P_r, M_r$. In the event that the value of an ideal state does not coincide with the value of the real state for at least one control subject, the integrity of the functional interconnection is considered to be violated, otherwise the integrity of the functional interconnection is considered to be nonviolated. In the event that the integrity is not violated, the deviation of the $Q_r$ state from the $Q_{id}$ state is a consequence of a modeling error of the state Qid, and the models of the CCS 200' must be corrected. In the event that the integrity is violated, the deviation of the state $Q_r$ from the state $Q_{id}$ is the consequence of an anomaly of the TS.

In a particular case, when searching in the DIS 320' (step 465, FIG. 5) among the memorized states of the control subjects for the state of a control subject characterized by a certain value (or a value acceptably close to the one obtained) obtained as a result of the initialization of the CCS 200' (step 462, FIG. 5) by the real state of the object of control $O_r$, the sought state of the control subject is not found. In this case, the deviation of the state $Q_r$ from the state $Q_{id}$ is a modeling error, and the model must be corrected (further trained). The correction consists in saving in the database DIS 320' the states $S_r, H_r, P_r, M_{id}$. In this case, $M_{id}(O_r) = \phi^{-1}[O_r]$, and the states S,H,P corresponding to $M_{id}$ are determined.

By monitoring module 310 and CCS 200 in the present invention is meant a real device, system, component, group of components realized with the use of hardware such as integrated microcircuits (application-specific integrated circuit, ASIC) or a (field-programmable gate array, FPGA) or, for example, in the form of a combination of software and hardware, such as a microprocessor system and a set of program instructions, and also one based on neurosynaptic chips. The functionality of the monitoring module 310 and the CCS 200 can be realized exclusively by hardware, and also in the form of a combination, where part of the functionality of the monitoring module 310 and the CCS 200 is realized by software, and part by hardware. In certain aspects, a part of the module 310 or the entire module 310 can be based on the processor of a general-purpose computer (e.g., the one shown in FIG. 7).

Figure 7:
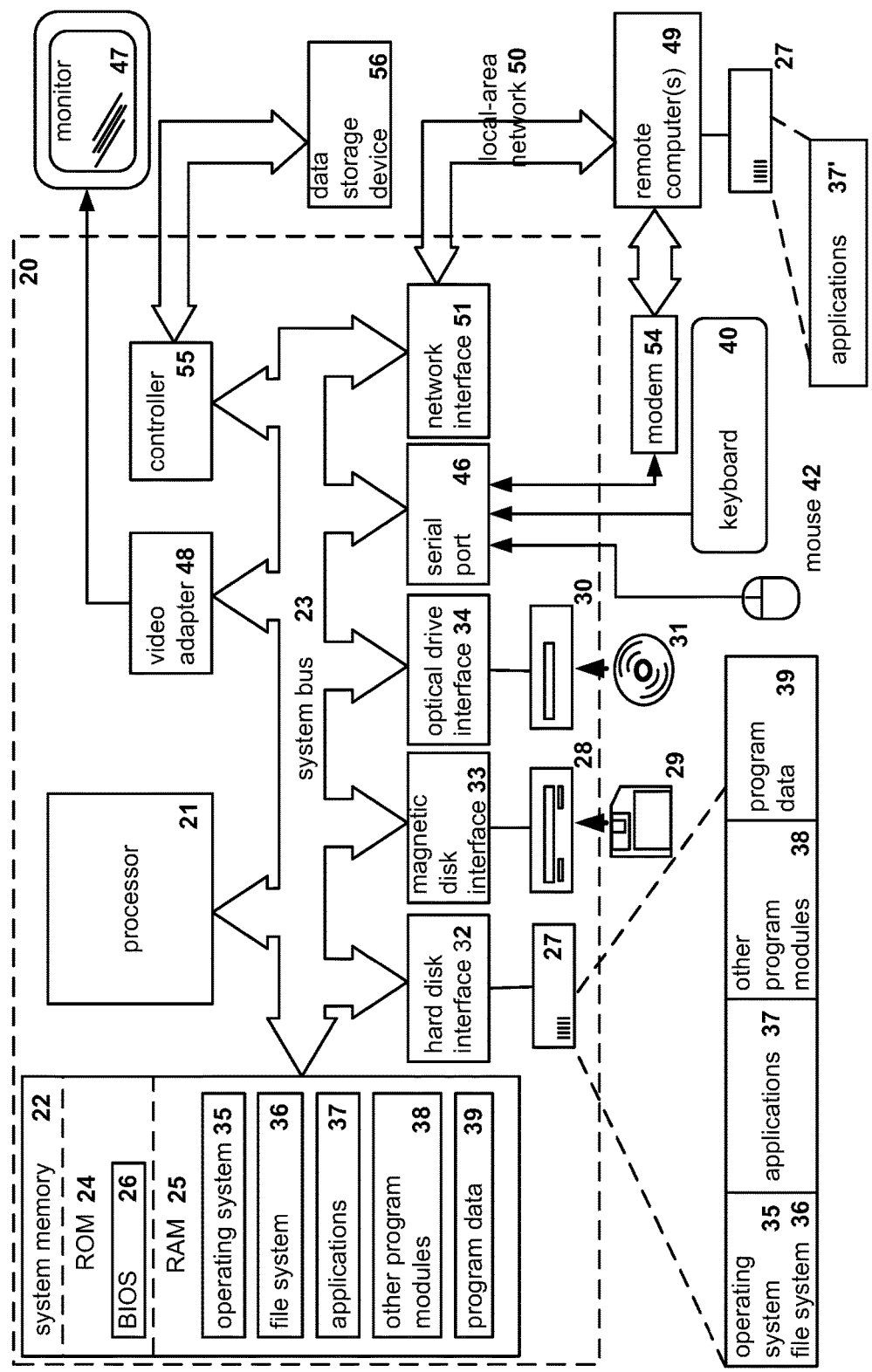
FIG. 7 illustrates an example of a general-purpose computer system on which the disclosed systems and method can be implemented.

FIG. 7 illustrates an example of a general-purpose computer system (which may be a personal computer or a server)

on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 7. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 7 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for monitoring operation of a technologic al system (TS), the method comprising:
    obtaining a real state of the TS at a first point in time, wherein the state of the TS is determined based on states of one or more elements of the TS, wherein the elements of the TS comprise a multilevel control subsystem comprising a plurality of control subjects configured to control operations of a material production process;
    initializing a cybernetic control system (CCS) by synchronizing the CCS with the TS in terms of time or in terms of state of the one or more elements of the TS, wherein synchronizing CCS in terms of state is done by synchronizing state of each cybernetic block of the CCS with the state of a corresponding element of the TS;
    comparing, by the CCS, the obtained real state of the TS with an ideal state of the TS, wherein the ideal state of the TS comprises a state of the CCS determined for the first point in time by modeling carried out by the CCS;
    based on the comparison, identifying a deviation of the real state of the TS from the ideal state of the TS;
    responsive to identifying the deviation, checking an integrity of at least one functional interconnection of the states of a plurality of control subjects including a first control subject and a second control subject that is functionally connected to the first control subject based on a pairwise comparison between real states of the first and second control subjects and corresponding ideal states of the first and second control subjects;
    determining that the ideal state of the TS for the point in time is a modeling error based on one or more confirmed sustained functional interconnections between the control subjects of the TS; and
    determining that one or more anomalies has occurred in the TS based on one or more disturbed functional interconnections between the control subjects of the TS identified during the integrity check.

2. The method of claim 1, wherein obtaining a real state of the TS includes using software, hardware or firmware agents deployed in the TS to intercept signals between elements of the TS.

3. The method of claim 1, wherein the CCS comprises a plurality of interconnected cybernetic blocks (CBs) that correspond to the control subjects of the TS, duplicate the interconnection of elements of the TS, and establish cause and effect relationships between input and output signals of each CB; wherein each CB models the change in the state of a separate element of the TS and the number of CBs corresponds to the number of elements of the TS, and wherein the relationship established by each CB is defined using one or more of a mathematical model, a logic model, a numerical model, a physical model, and a simulation model.

4. The method of claim 1, wherein checking an integrity of the at least one functional interconnection of the states of the plurality of elements of the TS includes:
    initializing the CCS by the real state of an object of control of the TS;
    determining the ideal state of the control subjects by modeling performed by the CCS for a given state of the object of control; and
    determining the ideal states determined by the CCS for the control subjects of the TS as compared to the real states of the control subjects of the TS.

5. The method of claim 4, wherein checking the integrity of at least functional interconnection of the states of one or more elements of the TS includes:
    comparing the ideal state of control subjects of the TS as determined by the CCS for a given state of an object of control with the real state of the control subjects of the TS for the same state of the object of control; and
    determining that the functional interconnection is disturbed when the ideal state of control subjects of the TS for a given state of an object of control does not coincide with the real state of the control subjects of the TS for the same state of the object of control,
    determining that the functional interconnection is sustained when the ideal state of control subjects of the TS for a given state of an object of control coincides with the real state of the control subjects of the TS for the same state of the object of control.

6. The method of claim 1, wherein a value of the deviation is computed as:

$$\frac{|Q_{id} - Q_r|}{Q_{id}} < \Delta, \text{ where:}$$

Qid is the ideal state of the TS as determined by the CCS;
Qr is the real state of the TS;
$\Delta$ is the permissible deviation.

7. A system for monitoring operation of a technological system (TS), the system comprising:
    a hardware processor configured to:
    obtain a real state of the TS at a first point in time, wherein the state of the TS is determined based on states of one or more elements of the TS, wherein the elements of the TS comprise a multilevel control subsystem comprising a plurality of control subjects configured to control operations of a material production process;
    initialize a cybernetic control system (CCS) by synchronizing the CCS with the TS in terms of time or in terms of state of the one or more elements of the TS, wherein synchronizing CCS in terms of state is done by synchronizing state of each cybernetic block of the CCS with the state of a corresponding element of the TS;
    compare, by the CCS, the obtained real state of the TS with an ideal state of the TS, wherein the ideal state of the TS comprises a state of the CCS determined for the first point in time by modeling carried out by the CCS;
    based on the comparison, identify a deviation of the real state of the TS from the ideal state of the TS;
    responsive to identifying the deviation, check an integrity of at least one functional interconnection of the states of a plurality of control subjects including a first control subject and a second control subject that is functionally connected to the first control subject based on a pairwise comparison between real states of the first and second control subjects and corresponding ideal states of the first and second control subjects;

determine that the ideal state of the TS for the point in time is a modeling error based on one or more confirmed sustained functional interconnections between control subjects of the TS; and determine that one or more anomalies has occurred in the TS based on one or more disturbed functional interconnections between control subjects of the TS identified during the integrity check.

8. The system of claim 7, wherein obtaining a real state of the TS includes using software, hardware or firmware agents deployed in the TS to intercept signals between elements of the TS.

9. The system of claim 7, wherein the CCS comprises a plurality of interconnected cybernetic blocks (CBs) that correspond to the control subjects of the TS, duplicate the interconnection of elements of the TS, and establish cause and effect relationships between input and output signals of each CB; wherein each CB models the change in the state of a separate element of the TS and the number of CBs corresponds to the number of elements of the TS, wherein the relationship established by each CB is defined using one or more of a mathematical model, a logic model, a numerical model, a physical model, or a simulation model.

10. The system of claim 7, wherein checking integrity of the at least one functional interconnections of the states of the plurality of elements of the TS includes:

initializing the CCS by the real state of an object of control of the TS;

determining the ideal state of the control subjects by modeling performed by the CCS for a given state of the object of control; and determining the ideal states determined by the CCS for the control subjects of the TS as compared to the real states of the control subjects of the TS.

11. The system of claim 10, wherein checking the integrity of functional interconnections of the states of the plurality of elements of the TS includes:

comparing the ideal state of control subjects of the TS as determined by the CCS for a given state of an object of control with the real state of the control subjects of the TS for the same state of the object of control; and determining that the functional interconnection is disturbed when the ideal state of control subjects of the TS for a given state of an object of control does not coincide with the real state of the control subjects of the TS for the same state of the object of control, determining that the functional interconnection is sustained when the ideal state of control subjects of the TS for a given state of an object of control coincides with the real state of the control subjects of the TS for the same state of the object of control.

12. The system of claim 7, wherein a value of the deviation is computed as:

$$\frac{|Q_{id} - Q_r|}{Q_{id}} < \Delta, \text{ where:}$$

$Q_{id}$ is the ideal state of the TS as determined by the CCS;
$Q_r$ is the real state of the TS;
$\Delta$ is the permissible deviation.

13. A non-transitory computer readable medium storing computer executable instructions for monitoring operation of a technological system (TS), including instructions for:

obtaining a real state of the TS at a first point in time, wherein the state of the TS is determined based on states of one or more elements of the TS, wherein the elements of the TS comprise a multilevel control subsystem comprising a plurality of control subjects configured to control operations of a material production process;

initializing a cybernetic control system (CCS) by synchronizing the CCS with the TS in terms of time or in terms of state of the one or more elements of the TS, wherein synchronizing CCS in terms of state is done by synchronizing state of each cybernetic block of the CCS with the state of a corresponding element of the TS;

comparing, by the CCS, the obtained real state of the TS with an ideal state of the TS, wherein the ideal state of the TS comprises a state of the CCS determined for the first point in time by modeling carried out by the CCS;

based on the comparison, identifying a deviation of the real state of the TS from the ideal state of the TS;

responsive to identifying the deviation, checking an integrity of at least one functional interconnection of the states of a plurality of control subjects including a first control subject and a second control subject that is functionally connected to the first control subject based on a pairwise comparison between real states of the first and second control subjects and corresponding ideal states of the first and second control subjects;

determining that the ideal state of the TS for the point in time is a modeling error based on one or more confirmed sustained functional interconnections between control subjects of the TS; and determining that one or more anomalies has occurred in the TS based on one or more disturbed functional interconnections between control subjects of the TS identified during the integrity check.

14. The non-transitory computer readable medium of claim 13, wherein obtaining a real state of the TS includes using software, hardware or firmware agents deployed in the TS to intercept signals between elements of the TS.

15. The non-transitory computer readable medium of claim 13, wherein the CCS comprises a plurality of interconnected cybernetic blocks (CBs) that correspond to the control subjects of the TS, duplicate the interconnection of elements of the TS, and establish cause and effect relationships between input and output signals of each CB; wherein each CB models the change in the state of a separate element of the TS and the number of CBs corresponds to the number of elements of the TS, and wherein the relationship established by each CB is defined using one or more of a mathematical model, a logic model, a numerical model, a physical model, or a simulation model.

16. The non-transitory computer readable medium of claim 13, wherein checking integrity of the at least one functional interconnection of the states of the plurality of elements of the TS includes:

initializing the CCS by the real state of an object of control of the TS;

determining the ideal state of the control subjects by modeling performed by the CCS for a given state of the object of control; and determining the ideal states determined by the CCS for the control subjects of the TS as compared to the real states of the control subjects of the TS.

17. The non-transitory computer readable medium of claim 16, wherein checking the integrity of functional interconnections of the states of the plurality of elements of the TS includes:
- comparing the ideal state of control subjects of the TS as determined by the CCS for a given state of an object of control with the real state of the control subjects of the TS for the same state of the object of control; and
- determining that the functional interconnection is disturbed when the ideal state of control subjects of the TS for a given state of an object of control does not coincide with the real state of the control subjects of the TS for the same state of the object of control,
- determining that the functional interconnection is sustained when the ideal state of control subjects of the TS for a given state of an object of control coincides with the real state of the control subjects of the TS for the same state of the object of control.

18. The non-transitory computer readable medium of claim 13, wherein a value of the deviation is computed as:

$$\frac{|Q_{id} - Q_r|}{Q_{id}} < \Delta, \text{ where:}$$

Qid is the ideal state of the TS as determined by the CCS;
Qr is the real state of the TS;
$\Delta$ is the permissible deviation.

* * * * *

UNITED STATES PATENT AND TRADEMARK OFFICE
CERTIFICATE OF CORRECTION

Page 1 of 1

PATENT NO.         : 10,469,527 B2
APPLICATION NO.    : 15/255773
DATED              : November 5, 2019
INVENTOR(S)        : Sergey V. Gordeychik et al.

It is certified that error appears in the above-identified patent and that said Letters Patent is hereby corrected as shown below:

On the Title Page

Item [73], should read:
-- AO Kaspersky Lab, Moscow (RU) --

Signed and Sealed this
Eighteenth Day of February, 2020

Andrei Iancu
*Director of the United States Patent and Trademark Office*